US007601407B2

(12) United States Patent
Irvine

(10) Patent No.: US 7,601,407 B2
(45) Date of Patent: Oct. 13, 2009

(54) INFLATABLE TREE APPARATUS

(76) Inventor: Allen Jacob Irvine, 719 Sigmund Rd., Naperville, IL (US) 60563

( * ) Notice: Subject to any disclaimer, the term of this patent is extended or adjusted under 35 U.S.C. 154(b) by 542 days.

(21) Appl. No.: 11/615,915

(22) Filed: Dec. 22, 2006

(65) Prior Publication Data

US 2007/0087142 A1    Apr. 19, 2007

(51) Int. Cl.
*A47G 33/06* (2006.01)
(52) U.S. Cl. .................. 428/20; 362/123; 362/806; 472/134; 446/220; 446/223
(58) Field of Classification Search .............. 40/412; 362/123, 567, 568; 446/187, 186, 220, 221, 446/222, 223, 224; 472/134; 428/18, 19, 428/20; D11/117, 118, 121, 125; *A47G 33/06*
See application file for complete search history.

(56) References Cited

U.S. PATENT DOCUMENTS

| | | | |
|---|---|---|---|
| D107,668 S * | 12/1937 | Wadsworth et al. | ......... D11/118 |
| 2,101,898 A * | 12/1937 | Crosser | ................. 362/249.16 |
| 2,186,327 A * | 1/1940 | Crosser | ...................... 362/123 |
| D142,323 S * | 8/1945 | Judd | ......................... D21/471 |
| D161,565 S * | 1/1951 | Baldanza | ................... D11/130 |
| 2,732,646 A * | 1/1956 | James | ......................... 428/20 |
| D406,787 S * | 3/1999 | Kan | ........................... D11/118 |
| D413,831 S * | 9/1999 | Grounds | .................... D11/118 |
| D435,479 S * | 12/2000 | Gansbuehler | .............. D11/118 |
| 6,764,201 B2 | 7/2004 | Chi-Cheng | |
| 7,125,311 B2 | 10/2006 | Wang | |
| 7,226,645 B1 * | 6/2007 | Braithwaite | .................. 428/18 |
| 7,311,580 B2 * | 12/2007 | Moomaw | .................... 446/179 |
| D594,774 S * | 6/2009 | Perry et al. | ................ D11/118 |
| 2005/0017457 A1 * | 1/2005 | Dubinsky | ................... 273/440 |

OTHER PUBLICATIONS

"6' Cones", printed from the World Wide Web, www.amazon.com, on Dec. 22, 2006, pp. 1-4.
"Topiary Cone Trees", Artificial Trees Catalogue, printed from the World Wide Web, www.christmastreewarehouse.co.uk, on Dec. 22, 2006, pp. 1-2.
"5' Inflatable Christmas Tree—SKU 000-XMS-05965," printed from the World Wide Web, https://www.treatsfortroops.com, on Dec. 21, 2006, pp. 1-2.
"Inflatable Christmas Tree," printed from the World Wide Web, http://www.prankplace.com, on Dec. 21, 2006, pp. 1-3.
"Inflatable Christmas Tree," printed from the World Wide Web, http://mpm.en.alibaba.com, on Dec. 21, 2006, pp. 1-2.
"Giant 8-Foot Inflatable Christmas Tree," printed from the World Wide Web, http://tfn.stores.yahoo.net/gi8inchtr.html, on Dec. 21, 2006, pp. 1-2.

(Continued)

*Primary Examiner*—John J. Zimmerman
*Assistant Examiner*—Aaron Austin
(74) *Attorney, Agent, or Firm*—McDonnell Boehnen Hulbert & Berghoff LLP

(57) ABSTRACT

An inflatable tree that may be used as an indoor or outdoor decoration, particularly during the Christmas holiday season. In one embodiment, the inflatable tree comprises an inflatable bladder having a substantially conical or cylindrical prism shape, wherein the axial direction of the bladder is oriented along a vertical axis, and a plurality of conical skirts attached to the bladder, wherein the plurality of conical skirts are attached at different points along the vertical axis.

21 Claims, 5 Drawing Sheets

OTHER PUBLICATIONS

"Inflatable Christmas Tree," printed from the World Wide Web, http://www.brandsonsale.com/gem-tree.html, on Dec. 21, 2006, pp. 1-3.

"Christmas Inflatable Outdoor Decorations," printed from the World Wide Web, http://www.creatableinflatables.com, on Dec. 21, 2006, pp. 1-3.

"Christmas Decorations," printed from the World Wide Web, http://caile.en.alibaba.com/, on Dec. 21, 2006, pp. 1-3.

"2.M Inflatable Christmas Tree with Lights—Pump Included," printed from the World Wide Web, http://www.dealsdirect.com, on Dec. 21, 2006, pp. 1-3.

* cited by examiner

INFLATABLE TREE APPARATUS

BACKGROUND OF THE INVENTION

1. Field of the Invention

This invention relates to an inflatable tree useful for consumer or commercial applications, and can be displayed in yards, homes or businesses for seasonal decorating or other personal or business purposes.

2. Related Art

Existing inflatable trees such as those disclosed in U.S. Pat. Nos. Des. 406,787, Des. 413,831, Des. 435,479, and others that are commercially available, typically comprise one or more inflatable regions, and have the appearance of simple inflatable balloons.

SUMMARY

Described herein is an apparatus for an inflatable tree that may be used as an indoor or outdoor decoration, particularly during the Christmas holiday season. In one embodiment, the inflatable tree comprises (i) an inflatable bladder having a substantially conical or cylindrical prism shape, wherein the axial direction of the bladder is oriented along a vertical axis, and (ii) a plurality of conical skirts attached to the bladder, wherein the plurality of conical skirts are attached to the bladder at different points along the vertical axis, that is, at different heights.

The inflatable bladder may be air-blown, such as by a continuously operating fan, or may be inflated and sealed to retain its shape without the need for continuous inflation. Thus, the material used for the inflatable bladder may be a fabric, such as nylon and may be semi-gas-permeable, or may be plastic, Mylar, or vinyl or other substantially gas-impermeable material.

The bladder is preferably substantially symmetrical about the vertical axis so as to have a similar appearance from all sides of the tree, and may have a cylindrical shape or conical shape, or substantially similar to those shapes so that the overall appearance of the inflatable bladder and conical skirts is tree-like.

The skirts are annular in shape in that they have an opening in the center where they attach to the central bladder. They may be fastened to the bladder such as by glue or may be sewn together, or the skirts may be detachable, such as by buttons, snaps, zippers, or hook and loop fasteners.

The skirts are also conical in shape so that they appear to hang down and provide the general appearance of a tier of branches of a coniferous or evergreen tree. The skirts are thus attached to the inflatable bladder at different heights to give the appearance of branches. The skirts need not be precise circular conical annular regions. That is, the skirts may be described as having an inner circumferential edge and an outer circumferential edge, where both circumferential edges are concentric circular regions, or one or both of the circumferential edges may be elliptical. The conical skirts may all have the same interior conical angle, that is, the skirts may all form the same angle with the vertical axis of the inflatable bladder, or they may have varying interior conical angles. The conical skirts may also include material, such as additional fabric or plastic that extends past the outer circumferential edge to provide an appearance of irregular branches.

The conical skirts may be made of semi-rigid plastic, or may be made of fabric, plastic, vinyl, etc. In some embodiments, the conical skirts may also include a rigid member attached to the conical skirt to allow the skirt to hang properly, or to otherwise form the shape of a cone. The rigid member may be made of metal, such a wire, or a metal or plastic ring, and may be attached to the skirt by sewing, glue, or other means, or by forming the rigid member integrally with the conical skirt. The rigid member may also be inflatable, such as an annular bladder attached to the skirt, where the skirt itself is not inflatable. The annular bladder may be substantially gas-impermeable so that they can be inflated and sealed when the tree is displayed, and can be deflated for storage. In embodiments using an air-blown bladder, the annular bladder may also be interconnected to the main bladder at one or more points to allow sufficient airflow from the air-blown bladder to flow into the annular bladder to provide the necessary rigidity to extend the annular conical skirt. In the various embodiments, the rigid members are preferably attached substantially near the outer circumferential edges of the conical skirts.

The conical skirts may be stored in a number of ways. The conical skirts may stack one within the next, in the way that cones are stackable. The rigid member of the conical skirts may also be sufficiently flexible so as to allow each skirt to be twisted upon itself so that the rigid member, such as a wire or plastic ring, forms two or three loops. Alternatively, the skirts may have a radial seam to allow for the separation of the conical skirt along the radial direction of the skirt to allow for easy storage of the skirts. In these embodiments, the rigid member preferably also separates along the radial seam.

In some embodiments, the inflatable tree may include a string of lights internal to the inflatable bladder extending substantially along the vertical axis. In addition, the tree may include lights, such as light-emitting diodes, placed along the annular conical skirts. Still further, the tree may include ornaments attached to the conical skirts.

These as well as other aspects, advantages, and alternatives, will become apparent to those of ordinary skill in the art by reading the following detailed description, with reference where appropriate to the accompanying drawings. Further, it should be understood that the foregoing summary, like the other description provided below, is intended to illustrate the invention by way of example only and not by way of limitation.

DETAILED DESCRIPTION OF PREFERRED EMBODIMENTS

The inflatable tree may be used as an indoor or outdoor decoration, particularly during the Christmas holiday season. The inflatable tree may be an outdoor yard decoration, or may be used indoors. The inflatable tree may also be filled with helium or other lighter-than-air gas, to make a balloon. The scale of the tree may be quite large, such as ten or twenty feet tall, or taller, or may be considerably smaller, such as one or two feet tall. The desired size and use of the tree will dictate in large part the particular materials and components used for the inflatable tree.

Figure 1:
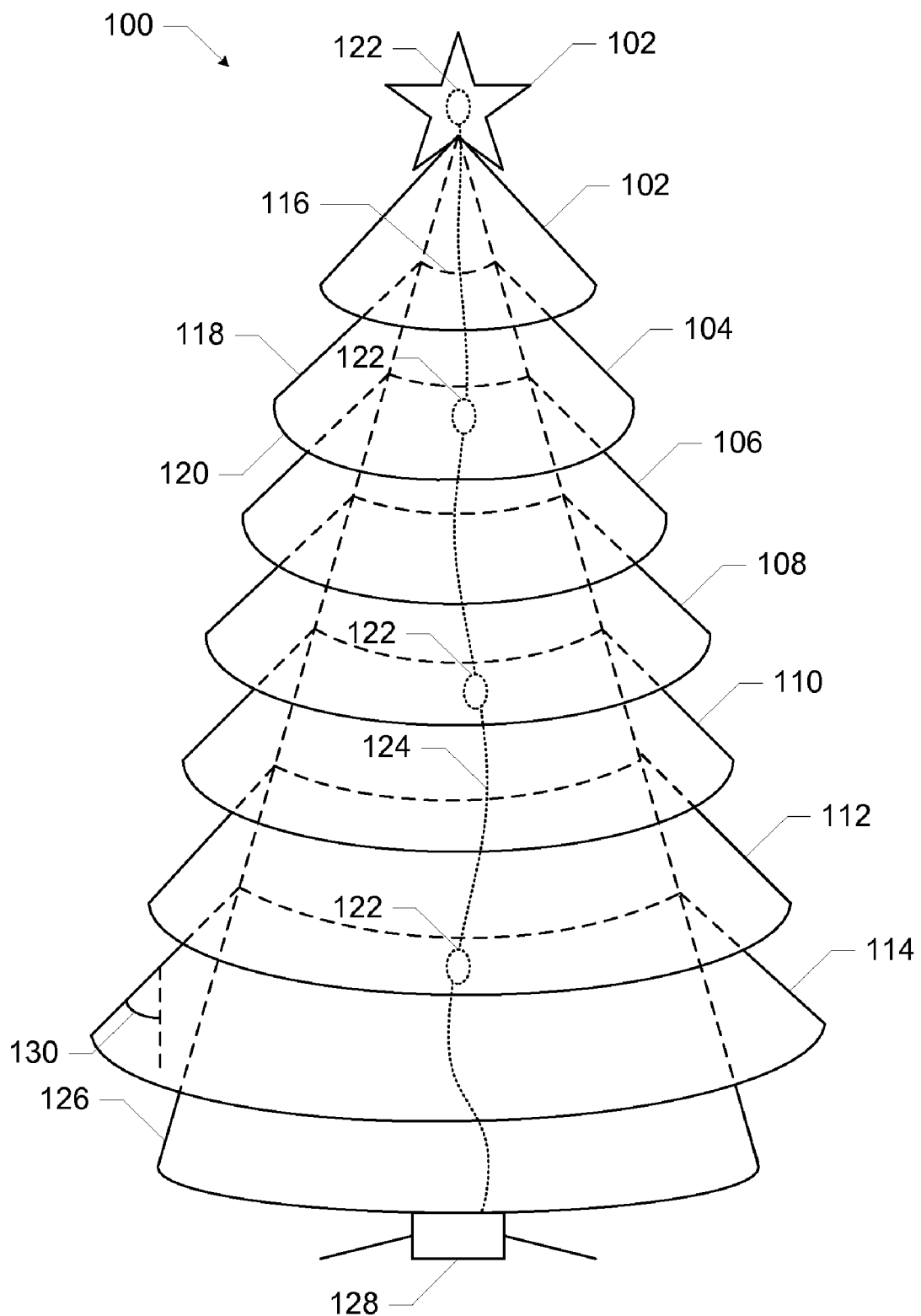
FIG. 1 is one preferred embodiment of an inflatable tree having a conical inflatable bladder.
Figure 2:
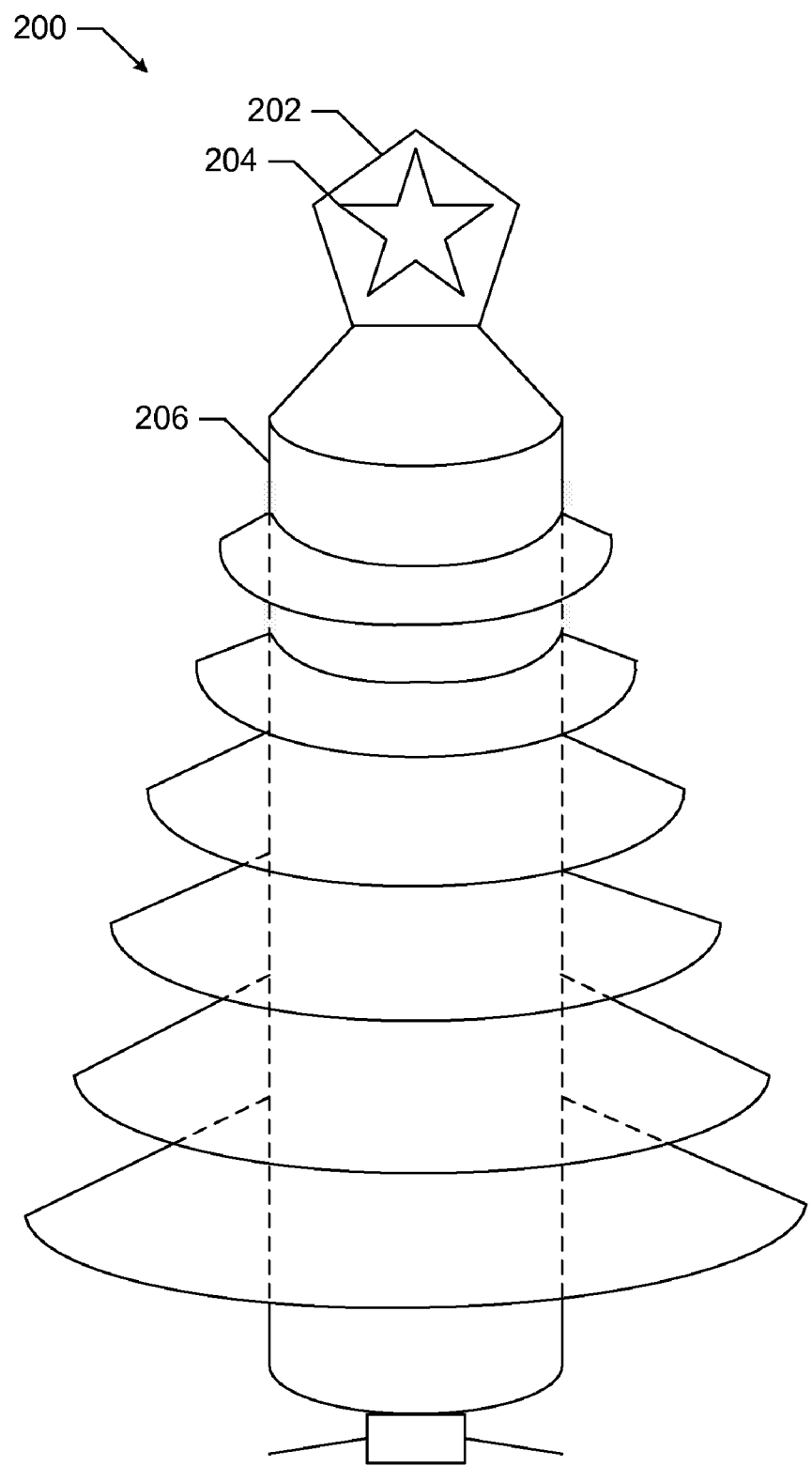
FIG. 2 is another preferred embodiment of an inflatable tree having a cylindrical inflatable bladder.

With reference to FIG. 1, the inflatable tree 100 comprises an inflatable bladder 126 having a substantially conical prism shape. That is, the cone is a three-dimensional cone shape, with the axial direction of the bladder being oriented along a vertical axis. The bladder is preferably substantially symmetrical in the radial direction (in the planar direction perpendicular to the vertical axis) so as to have a similar appearance from all sides of the tree. Alternatively, the inflatable bladder may have a substantially cylindrical shape, as shown in the tree 200 of FIG. 2, having inflatable bladder 206. In either case, the shape of the bladder is substantially cylindrical or conical so that the overall appearance of the inflatable bladder and conical skirts is tree-like.

The inflatable bladder 126 may be air-blown, such as by a continuously operating fan 128. Fans used to inflate decorative figures that may be used with the tree apparatus described herein are known, such as that described in U.S. Pat. No. 6,764,201, assigned on its face to the Gemmy Industries Corporation of Irving, Tex., entitled "Inflatable Figure Assembly" issued Jul. 20, 2004, the contents of which are hereby incorporated by reference. In a fan-blown, or air-blown, embodiment, the material used for the inflatable bladder may be a fabric, such as nylon and may be semi-gas-permeable.

Alternatively, inflatable bladders 126, 206 may be inflated and sealed (by a plug, knot, clip, etc.) to retain their shape without the need for continuous inflation. Thus, the material used for the inflatable bladder may be substantially gas-impermeable, such as plastic, Mylar, or vinyl or other substantially gas-impermeable material.

Attached to the bladder 126 (or 206) are a plurality of conical skirts 102, 104, 106, 108, 110, 112, 114. The conical skirts are attached to the bladder at different heights, and preferably have increasing diameters towards the bottom of the tree to give the appearance of tree branches, or tiers of branches of a tree. They may be fastened to the bladder such as by glue or may be sewn together, or the skirts may be detachable, such as by buttons, snaps, zippers, or hook and loop fasteners.

The skirts are annular in shape in that they have an opening in the center where they attach to the central bladder. With reference to FIG. 1, a skirt 118 may be described as having an inner circumferential edge 116 and an outer circumferential edge 120, where both circumferential edges are concentric circular regions. The skirt 118 is also conical in shape so that it appears to hang down and provide the general appearance of a tier of branches of a coniferous or evergreen tree. The conical skirts may all have the same interior conical angle 130, that is, the skirts may all form the same angle with the vertical axis of the inflatable bladder, or they may have varying interior conical angles.

Figure 3A:
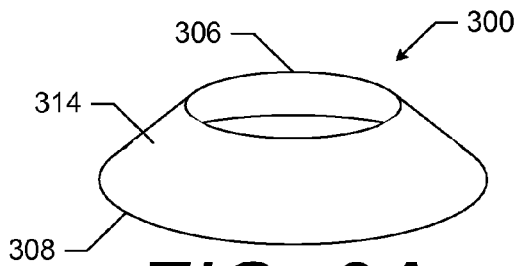
FIGS. 3A, 3B, and 3C depict various embodiments of an annular conical skirt.
Figure 3B:
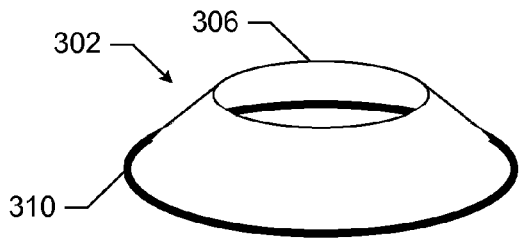

The conical skirts may be made of semi-rigid plastic such as the skirt 300 in FIG. 3A, where the skirt material 314 has an inner circumferential edge 306 and an outer circumferential edge 308. Alternatively, the skirt may be made of fabric, plastic, Mylar, vinyl, etc. In some embodiments, such as the skirts 302, 304 in FIGS. 3B and 3C, the conical skirts may also include a rigid member 310, 312 attached to the conical skirt to allow the skirt to hang properly, or to otherwise form the shape of a cone. The rigid member 310 may be made of metal, such as wire (preferably spring steel that will retain the ring shape even after being deformed, such as during storage), or a metal or plastic ring, and may be attached to the skirt by sewing, glue, or other means, or by forming the rigid member integrally with the conical skirt. In the embodiment of FIG. 3A, the rigidity may be provided by the skirt 314 material itself such that it hangs in a substantially conical shape without further materials added for weight or reinforcement.

Figure 3C:
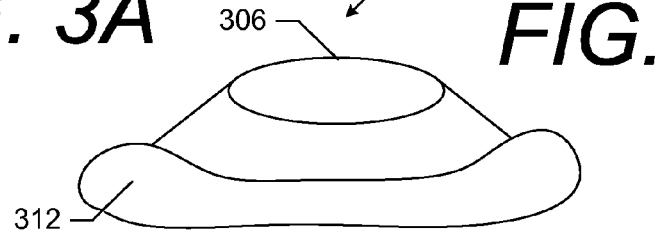

The rigid member may also be inflatable, such as an annular bladder 312 attached to the skirt 304 of FIG. 3C, where the skirt itself is not inflatable. The annular bladder 312 may be substantially gas-impermeable so that it can be inflated and sealed when the tree is displayed, and can be deflated for storage. In embodiments using an air-blown bladder, the annular bladder 314 may also be interconnected to the main bladder at one or more points to allow sufficient airflow from the air-blown bladder to flow into the annular bladder 312 to provide the necessary rigidity to extend the annular conical skirt 304. In the various embodiments, the rigid members are preferably attached substantially near the outer circumferential edges of the conical skirts.

Figure 4A:
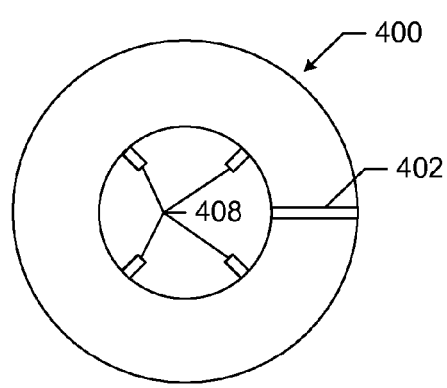
FIGS. 4A, 4B, 4C and 4D depict various storage options for an annular conical skirt.
Figure 4B:
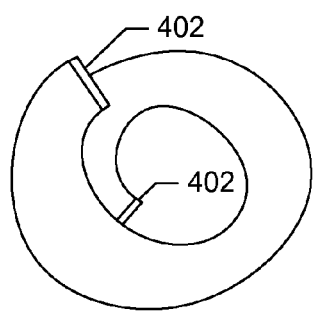
Figure 4C:
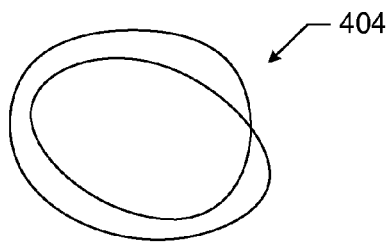
Figure 4D:
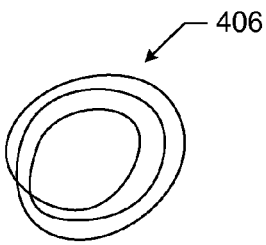

The conical skirts may be stored in a number of ways. The conical skirts may stack one within the next, in the way that cones are stackable. As shown in FIGS. 4C and 4D, the rigid member of the conical skirts may also be sufficiently flexible so as to allow each skirt to be twisted upon itself so that the rigid member, such as a wire or plastic ring, forms two or three loops 404, 406. Alternatively, FIGS. 4A and 4B depict a skirt 400 having a radial seam 402 to allow for the separation of the conical skirt along the radial direction of the skirt 400 to allow for easy storage of the skirts. In these embodiments, the rigid member preferably also separates along the radial seam. Also shown in FIG. 4A are hook and loop fasteners 408 for attaching the skirt 400 to the bladder.

Figure 5A:
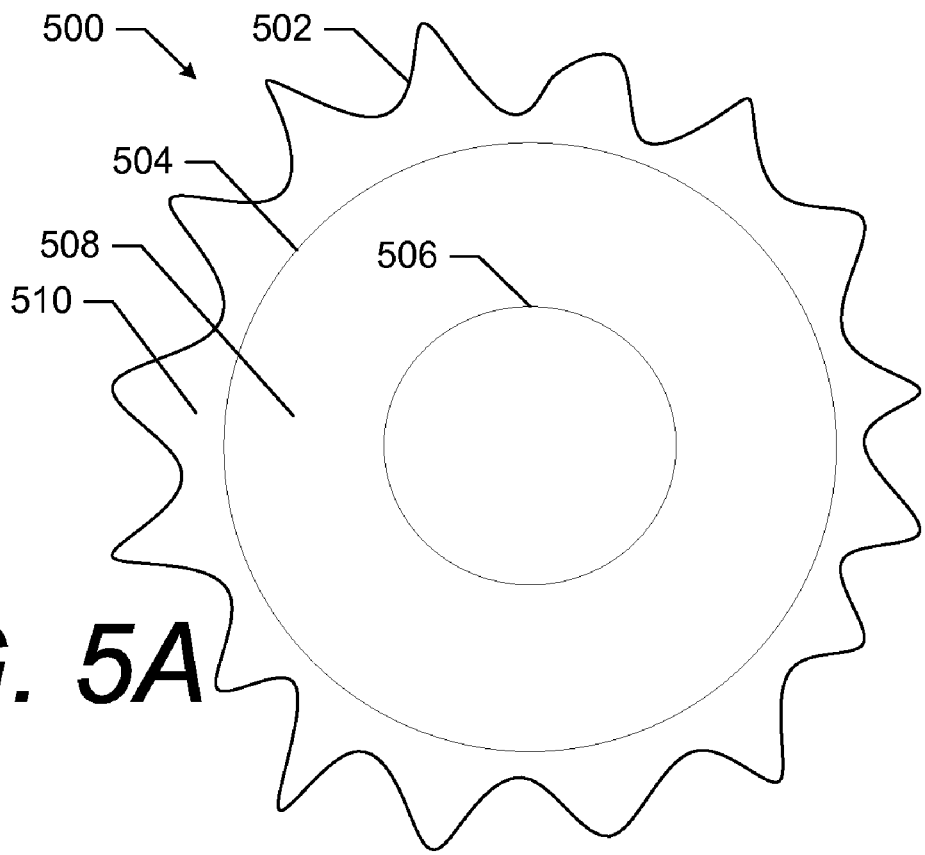
FIGS. 5A and 5B depict an alternative annular conical skirt.
Figure 5B:
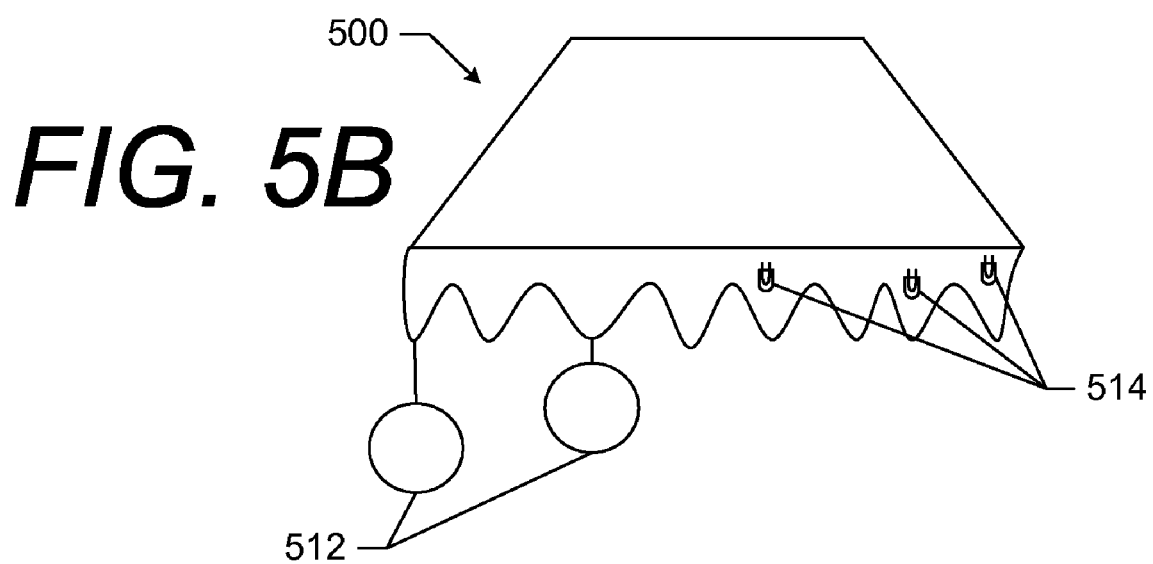

As shown in FIGS. 5A and 5B, the conical skirt 500 having inner circumferential edge 506, outer circumferential edge 504 and annular conical skirt region 508, may also include material 510, such as additional fabric or plastic that extends past the outer circumferential 504 edge to provide an appearance of irregular branches, having an irregular outer edge 502. In one embodiment, the material 510 may include, or form, an annular bladder as discussed with respect to bladder 312 in FIG. 3C. That is, the region 510 may comprise an annular bladder.

Figure 6A:
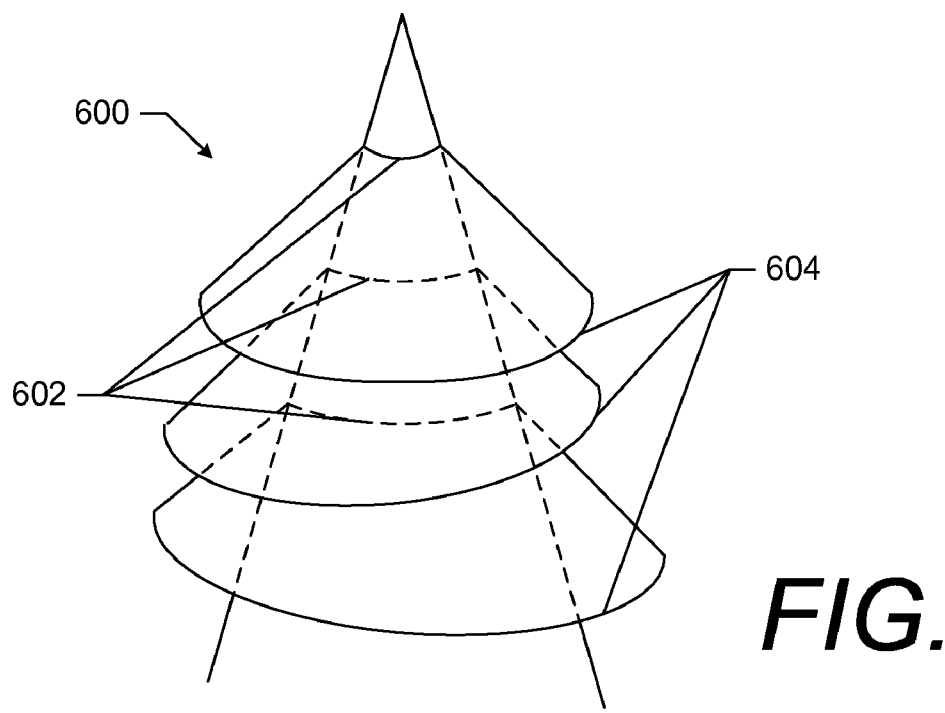
FIGS. 6A and 6B depict further alternative annular conical skirts.
Figure 6B:
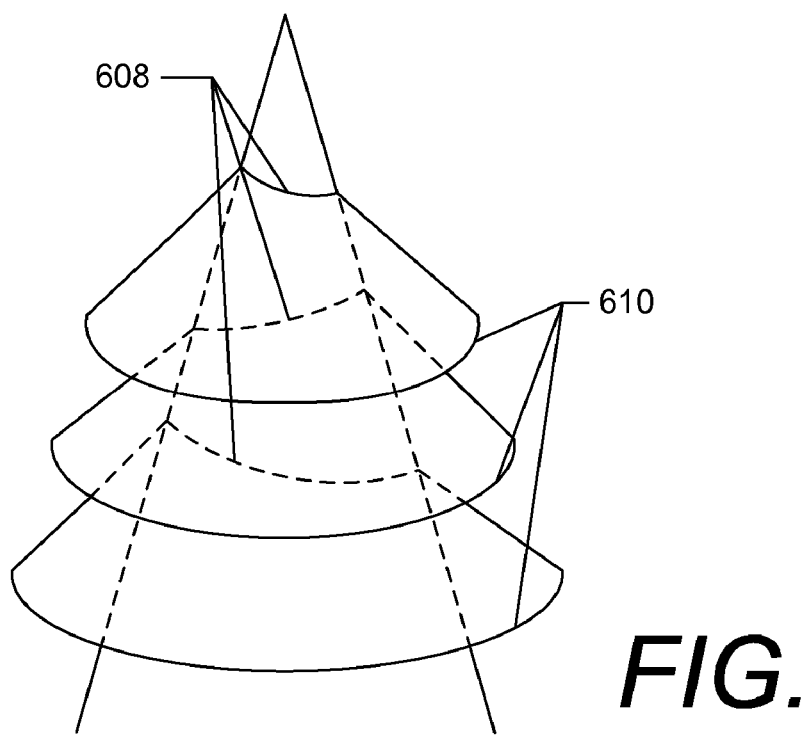

The skirts need not be precise circular conical annular regions. One or both of the circumferential edges may be elliptical. In one preferred embodiment 600 shown in FIG. 6A, the inner circumferential edge 602 is circular, while the outer circumferential edge 604 is elliptical. In this particular embodiment, the inner conical angle of the skirts remains substantially equal among all the skirts. In an alternative embodiment 606 shown in FIG. 6B, the inner circumferential edge 608 is elliptical, and is attached to the circular bladder at an angle. The skirt material is shorter on one side than the other, so that the outer circumferential edge 610 still hangs or resides in a plane substantially perpendicular to the vertical axis of the inflatable bladder 612. The minor and major axes of the elliptical inner circumferential edges of the skirts may be oriented in different radial directions to thereby give a more random appearance to the skirts.

In some embodiments, the inflatable tree may include a string of lights 122 internal to the inflatable bladder extending substantially along the vertical axis, as shown in FIG. 1. The tree may also include a star atop the tree that may be interconnected to the inflatable bladder. The star may be a star-shaped addition to the bladder such as star 102, or it may be a graphical figure of a star 204 on a larger, more easily manufactured addition 202 to the inflatable bladder 206. In addition, the tree may include lights, such as light-emitting diodes 514, placed along the annular conical skirts, as shown in FIG. 5B. Still further, the tree may include ornaments 512 attached to the conical skirts.

Exemplary embodiments of the present invention have been described above. Those skilled in the art will understand, however, that changes and modifications may be made to these embodiments without departing from the true scope and spirit of the present invention, which is defined by the claims.

I claim:

1. An inflatable tree apparatus comprising:
   an inflatable bladder having a substantially conical or cylindrical prism shape, wherein the bladder is oriented along a vertical axis; and,
   a plurality of conical skirts attached to the bladder, wherein the plurality of conical skirts are attached at different points along the vertical axis.

2. The apparatus of claim 1 further comprising a fan assembly attached to the inflatable bladder for continuously blowing air into the inflatable bladder.

3. The apparatus of claim 1 wherein the inflatable bladder is substantially gas-impermeable.

4. The apparatus of claim 1 wherein the inflatable bladder is semi-gas-impermeable.

5. The apparatus of claim 1 wherein the bladder is substantially symmetrical about the vertical axis.

6. The apparatus of claim 1 wherein each of the plurality of conical skirts is an annular conical skirt made of semi-rigid plastic.

7. The apparatus of claim 1 wherein each of the plurality of conical skirts is an annular conical skirt made of fabric.

8. The apparatus of claim 1 wherein each of the plurality of conical skirts has an interior conical angle, and wherein all the interior conical angles of the plurality of conical skirts are equal.

9. The apparatus of claim 1 wherein each of the plurality of conical skirts comprises:
   an annular conical skirt, the conical skirt having an outer circumferential edge and an inner circumferential edge; and,
   a rigid member attached to the conical skirt substantially near the outer circumferential edge.

10. The apparatus of claim 9 wherein the inner circumferential edge and outer circumferential edge are concentric circles.

11. The apparatus of claim 9 wherein at least the inner circumferential edge is an ellipse.

12. The apparatus of claim 1 wherein at least some of the plurality of conical skirts are attached to the bladder using hook and loop fasteners.

13. The apparatus of claim 1 wherein at least some of the plurality of conical skirts are attached to the bladder using button fasteners.

14. The apparatus of claim 1 wherein at least some of the plurality of conical skirts have a radial seam for separating the conical skirt.

15. An inflatable apparatus comprising:
   an air bladder having a vertical axis;
   a plurality of annular conical skirts attached to the bladder at different locations along the vertical axis, wherein each conical skirt has an outer circumferential edge and an inner circumferential edge and a rigidifying means attached to the conical skirt substantially near the outer circumferential edge for extending the conical skirt.

16. The apparatus of claim 15 wherein the rigidifying means is a metal ring.

17. The apparatus of claim 15 wherein the rigidifying means is a plastic ring.

18. The apparatus of claim 15 wherein the rigidifying means is an inflatable ring.

19. The apparatus of claim 15 wherein the annular conical skirts further comprise material extending past the outer circumferential edge, the material providing the appearance of tree branches.

20. The apparatus of claim 15 further comprising a string of lights internal to the inflatable bladder extending substantially along the vertical axis.

21. The apparatus of claim 15 further comprising lights placed along the annular conical skirt.

* * * * *